US011816221B2

(12) United States Patent
Singh

(10) Patent No.: US 11,816,221 B2
(45) Date of Patent: Nov. 14, 2023

(54) SOURCE CODE VULNERABILITY SCANNING AND DETECTION SMART GLASSES

(71) Applicant: Bank of America Corporation, Charlotte, NC (US)

(72) Inventor: Shailendra Singh, Maharashtra (IN)

(73) Assignee: Bank of America Corporation, Charlotte, NC (US)

( * ) Notice: Subject to any disclaimer, the term of this patent is extended or adjusted under 35 U.S.C. 154(b) by 429 days.

(21) Appl. No.: 17/237,305

(22) Filed: Apr. 22, 2021

(65) Prior Publication Data

US 2022/0342998 A1 Oct. 27, 2022

(51) Int. Cl.
*G06F 21/57* (2013.01)
*G06F 1/16* (2006.01)
(Continued)

(52) U.S. Cl.
CPC ....... *G06F 21/577* (2013.01); *G02B 27/0172* (2013.01); *G02C 11/10* (2013.01); *G06F 1/163* (2013.01); *G06N 5/04* (2013.01); *G06N 20/00* (2019.01); *H04W 76/10* (2018.02); *G02B 2027/014* (2013.01); *G02B 2027/0138* (2013.01); *G02B 2027/0178* (2013.01);
(Continued)

(58) Field of Classification Search
CPC .. G06F 21/577; G06F 1/163; G06F 2221/033; H04W 76/10; H04W 4/80; H04W 84/12; G06N 20/00; G06N 5/04; G02B 27/0172; G02B 2027/0138; G02B 2027/014; G02B 2027/0178; G02C 11/10
See application file for complete search history.

(56) References Cited

U.S. PATENT DOCUMENTS

| 6,243,076 | B1 * | 6/2001 | Hatfield | .................. G06F 3/038 |
| | | | | 715/977 |
| 9,331,856 | B1 | 5/2016 | Song | |

(Continued)

OTHER PUBLICATIONS

"DevOps," https://en.wikipedia.org/wiki/DevOps, Wikimedia Foundation, Inc., Mar. 9, 2021.

(Continued)

*Primary Examiner* — Stephen T Gundry
(74) *Attorney, Agent, or Firm* — Weiss & Arons LLP

(57) ABSTRACT

Systems and methods for leveraging smart glasses for identifying vulnerabilities in application source code is provided. The smart glasses may be configured to scan the code from a user interface ("UI") linked to an internal development platform and project the scanned code on a display of the smart glasses. Using deep learning, the smart glasses may be enabled to identify one or more vulnerabilities within the scanned application source code. The smart glasses may link a vulnerability classification code for each identified vulnerability. The smart glasses may generate a vulnerability report file including the scanned application source code, each identified vulnerability and its linked vulnerability classification code and transfer the vulnerability report file to a source code repository within the internal development platform. The scanned application source code may be matched to the original application source code and further separate the marched original application source code for assessment.

20 Claims, 5 Drawing Sheets

(51) Int. Cl.

| | | |
|---|---|---|
| *G06N 20/00* | (2019.01) | |
| *G06N 5/04* | (2023.01) | |
| *H04W 76/10* | (2018.01) | |
| *G02B 27/01* | (2006.01) | |
| *G02C 11/00* | (2006.01) | |
| *H04W 4/80* | (2018.01) | |
| *H04W 84/12* | (2009.01) | |

(52) U.S. Cl.
CPC ......... *G06F 2221/033* (2013.01); *H04W 4/80* (2018.02); *H04W 84/12* (2013.01)

(56) References Cited

U.S. PATENT DOCUMENTS

| | | | |
|---|---|---|---|
| 9,460,351 | B2 | 10/2016 | Kim et al. |
| 9,665,818 | B1 | 5/2017 | Cardinal et al. |
| 9,679,152 | B1 | 6/2017 | Young et al. |
| 9,823,735 | B2 | 11/2017 | Spiessl et al. |
| 11,720,686 | B1 * | 8/2023 | Cross .................. G06F 21/577 726/25 |
| 2015/0310751 | A1 | 10/2015 | Tolia |
| 2016/0041613 | A1 | 2/2016 | Klanner et al. |
| 2017/0156589 | A1 | 6/2017 | Wu et al. |
| 2017/0214696 | A1 | 7/2017 | Cleaver et al. |
| 2018/0005440 | A1 | 1/2018 | Mullins |
| 2018/0036974 | A1 | 2/2018 | Hahn et al. |
| 2018/0108079 | A1 | 4/2018 | Traub |
| 2022/0035928 | A1 * | 2/2022 | Siman .................. G06F 21/577 |
| 2023/0126950 | A1 * | 4/2023 | Soudhamma ........... G06F 16/25 726/25 |
| 2023/0154266 | A1 * | 5/2023 | Carter ............. G08B 13/19621 340/541 |
| 2023/0179955 | A1 * | 6/2023 | Williams ............... G16H 20/70 455/456.1 |
| 2023/0188991 | A9 * | 6/2023 | Segal .................... H04W 12/08 726/4 |
| 2023/0206708 | A1 * | 6/2023 | Carter ................ G07C 9/00896 348/155 |
| 2023/0216868 | A1 * | 7/2023 | March .................... G06N 20/00 726/23 |
| 2023/0224320 | A1 * | 7/2023 | Irimie ...................... G06N 5/02 726/25 |
| 2023/0261878 | A1 * | 8/2023 | Madisetti .............. H04L 9/3236 709/227 |

OTHER PUBLICATIONS

"Smartglasses," https://en.wikipedia.org/wiki/Smartglasses, Wikimedia Foundation, Inc., Feb. 21, 2021.
"Wearable Technology-Smart Glasses," https://www.optiscangroup.com/smartglasses, Optiscan, Retrieved on Mar. 4, 2021.
"What is DevOps?" https://aws.amazon.com/devops/what-is-devops/, Amazon Web Services, Inc., Retrieved on Mar. 9, 2021.

* cited by examiner

SOURCE CODE VULNERABILITY SCANNING AND DETECTION SMART GLASSES

FIELD OF TECHNOLOGY

Aspects of the disclosure relate to smart glasses. Specifically, this disclosure relates to identifying vulnerabilities within source code using smart glasses.

BACKGROUND OF THE DISCLOSURE

Application source code for applications is typically reviewed by one or more individuals and/or groups of reviewers in order to identify vulnerabilities. The application source code is reviewed prior to execution of the application.

Reviewers may be individuals within an entity. Reviewers may be from a third-party. Whether the reviewer is a part of the entity or from a third-party, accessing the application source code enables them to have access to the source code repository environment. This may lead to issues with integrity of the code.

Additionally, there may be tools that entities may use to test the application source code. These tools may check the complexity and the run-time aspects of the application source code. However, security issues and compliance that need to be identified, may only be identified manually and not automatically.

Therefore, it would be desirable to implement smart glasses for identifying vulnerabilities within application source code. For the purposes of this disclosure, smart glasses may be understood to mean wearable glasses that include one or more processors as well as other related components.

It would be further desirable to automate the process of identifying security issues in application source code using the smart glasses.

SUMMARY OF THE DISCLOSURE

A method for leveraging smart glasses for scanning and identifying vulnerabilities within application source code is provided. The application source code may be scanned independent of accessing an internal development platform. The application source code may be a portion of source code from an application.

The method may include scanning, using a scanning device embedded on the smart glasses, application source code displayed on a user interface ("UI"). The method may further include projecting the scanned application source code on a display on the smart glasses.

The method may include converting the scanned application source code to a format to enable deep learning.

Following the converting of the scanned application source code, the method may also include parsing the scanned application source code. The parsing may include separating the code into different portions where each portion may be a subroutine including a beginning, middle and end to the code. The subroutines may be self-contained sections of code to enable a precise identification of the vulnerabilities.

The method may further include identifying, based on the parsing, one or more vulnerabilities within the scanned application source code. The identifying may be identified based on pre-stored vulnerabilities within a source code vulnerability library stored in an open-source cloud repository.

The method may also include identifying one or more vulnerabilities within the scanned application source code using machine-learning ("ML"). The identifying may include searching the application source code for one or more features stored in a ML database. Each feature may be associated with at least one of the vulnerabilities.

The identifying may be received via an identification vulnerability application executed by the processor. The identifying may be received via input by a user of the smart glasses. The input may be inputted via selecting by finger-touch on the augmented virtual screen, each identified vulnerability and highlighting the selected code to mark each vulnerability.

Following the identifying, the method may further include linking a vulnerability classification code for each identified vulnerability. The vulnerability classification code may be retrieved from a classification code library within a cloud repository. The cloud repository may reside on a cloud independent from the internal development platform.

The classification code library may include vulnerability classification codes for each type of vulnerability and/or each category of vulnerabilities. Vulnerabilities may include syntax errors, duplicates, hard-code pasted into the code that may not belong. Personal and/or private data may also be included in vulnerabilities.

The method may also include generating a vulnerability report file. The vulnerability report file may include the scanned application source code, each identified vulnerability and its linked vulnerability classification code.

Following the generating, the method may include transferring the vulnerability report file to a source code repository within the internal development platform.

When the vulnerability report file is received at the internal development platform, the method may include extracting from the vulnerability report file, the scanned application source code, each identified vulnerability and the linked vulnerability classification code associated with each identified vulnerability.

The method may further include matching the scanned application source code to an original application source code within the source code repository.

In response to the matching, the method may include separating the original application source code from the application within the source code repository. The separating may be separated pending completion of revisions to the code, the revisions being based off of the vulnerability report file.

In some embodiments, the smart glasses may be operable to be a primary reviewer of the scanned application source code. The method may further include sharing the scanned application source code with one or more additional smart glasses, the one or more additional smart glasses may be operable to be a secondary reviewer of the scanned application source code. To enable the sharing, the method may include positioning the smart glasses with a pre-determined proximity to the one or more additional smart glasses and further transmitting, using NFC, the scanned application source code to the one or more additional smart glasses.

In other embodiments, the sharing may be enabled via electronic communication with a local network.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION OF THE DISCLOSURE

Figure 1:
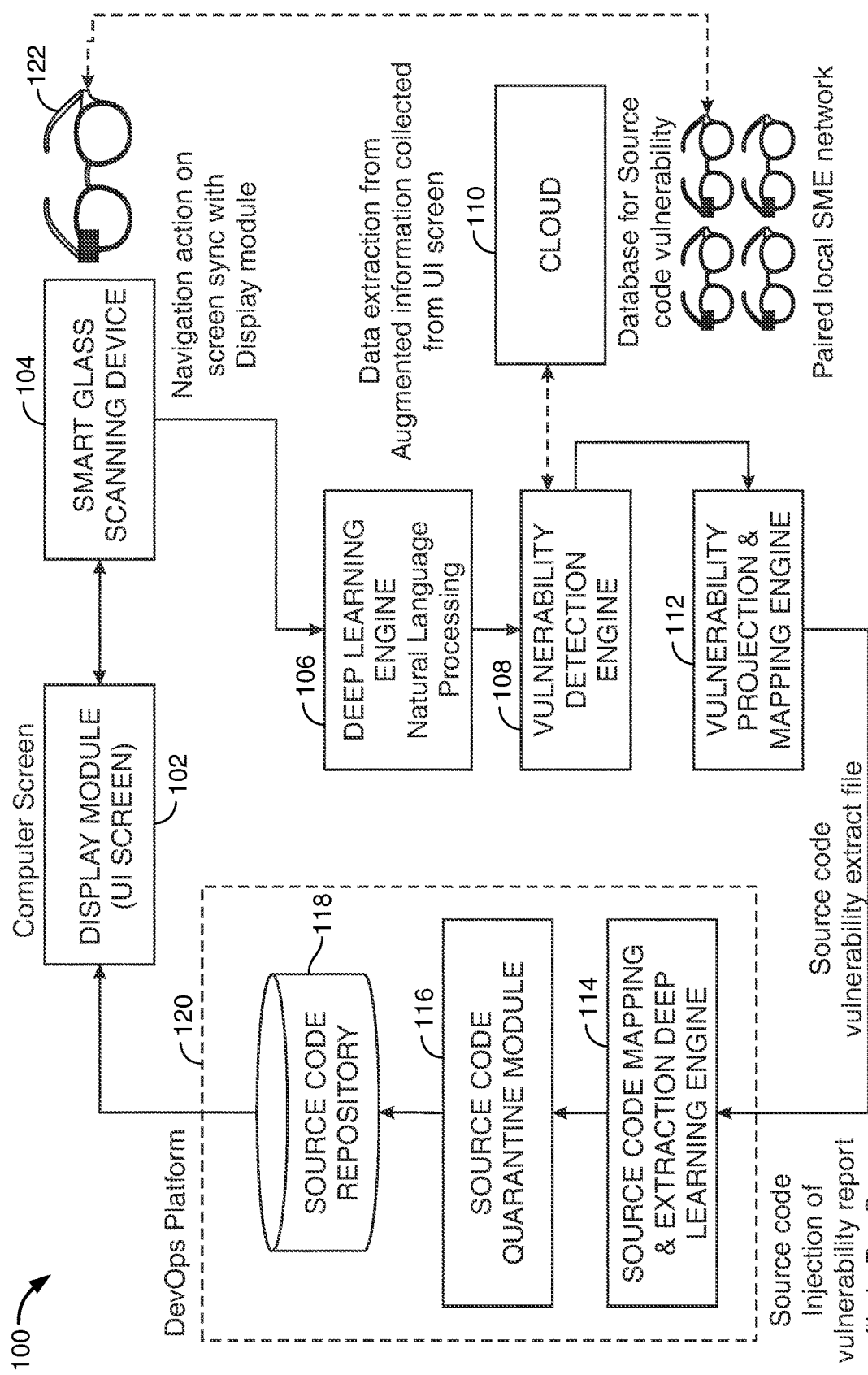
FIG. 1 shows an illustrative architecture diagram in accordance with principles of the disclosure.

Architecture for a smart glasses device is provided. The smart glasses may be leveraged for capturing application source code associated with an application and further identifying vulnerabilities within the application source code.

Smart glasses may be understood to mean wearable glasses that include both hardware and software components. One or more processors may be included in the hardware components of the smart glasses. The one or more processors may include one or more microprocessors. The microprocessor may provide processing capabilities to the plurality of hardware components and the plurality of software components within the smart glasses.

In addition to the processors, smart glasses may also include hardware components associated with conventional glasses. Such conventional components may include a frame and lenses.

Other hardware components of smart glasses may include one or more displays, one or more cameras for capturing photographs and/or videos, one or more audio input devices, one or more audio output devices, one or more communication transceivers, one or more wired and/or wireless communication applications (e.g., Bluetooth®, Beacon®) and/or any other suitable hardware components.

The smart glasses display may display data as instructed by the microprocessor. In one embodiment, the smart glasses display may be physically configured to add data alongside what the wearer sees through the lenses. In some embodiments, the smart glasses display may display data as an at least partially transparent overlay on top the lenses. As such, the user may view, through the overlay, the physical objects that are normally seen through lenses. Such a smart glasses display may be known as an augmented reality smart glasses display.

Additionally, smart glasses may utilize cellular technology or Wi-Fi to be operable as wearable computers which may run self-contained mobile applications. Smart glasses may be hands-on and/or handsfree and may be enabled to communicate with the Internet through natural language voice commands. Some smart glasses may require the use of touch buttons on the frame.

The weight of such smart glasses devices may be in the area of between about 20 grams to 60 grams or less or more than this range. The width of the lenses of such smart glasses devices may be between about 45 millimeters (mm) and 65 mm, and most preferably between about 50 mm to 56 mm. The length of the frames may be between about 126 mm and 153 mm.

Another component of smart glasses may include the ability for smart glasses to modify its optical properties, such as tint and change the prescription of the lenses. The optical properties modification may be executed at any given time. Smart glasses may change optical properties of the lenses by executing one or more software applications on the internal processors.

Smart glasses may also include one or more communication transceivers. The communication transceivers may be operable to communicate with external processors. The external processors may be included in a mobile device or any other suitable computing device.

The smart glasses may include a scanning device. The scanning device may be a camera. The scanning device may be configured to scan application source code displayed on a user interface ("UI").

The UI may be a screen. The screen may be connected to a computer, laptop, iPad and/or any other electronic device. In some embodiments, the UI may be a non-electronic device.

The UI may display application source code that may be from an internal source code application repository within an internal development platform associated with the application. When a user accesses the application source code directly within the device connected to the UI, the user may be enabled to have access to an internal source code application repository. The user may also be able to access the internal development platform as well. In accordance with principles of the disclosure, by capturing the application source code on the smart glasses, the user of the smart glasses may not be connected to the internal development repository and/or platform.

The internal development platform may be an internal network of the entity where source code for applications may be created, developed and deployed. The internal development platform may include one or more networks and servers. The internal development platform may be setup as a software development and IT operations type ("DevOps") platform. A DevOps platform may be a platform that combines software development and IT operations within a software development environment.

The DevOps platform may enable an entity to increase the entity's ability to deliver applications and services at high velocity. The DevOps platform may enable automating and streamlining the software development and infrastructure management processes. DevOps tools enable performing very frequent but small updates. Frequent but small updates may enable each deployment less risky. Errors and bugs may be corrected faster because associated teams may identify the last deployment that caused the error. Updates, in a DevOps platform may be deployed frequently. Additionally, a microservices architecture may be used within the DevOps platform which may enable decoupling large, complex systems into simple independent projects. the applications may be divided into a plurality of individual components and may be operated independently.

The DevOps platform may also enable continuous integration which may enable changes in code to be regularly merged into the central repository within the platform after which automated builds and tests may be run. The continuous integration may enable identifying vulnerabilities and bugs and reduce the time it may take to be validated and deployed. The DevOps platform may also enable continuous delivery within the platform which may enable deploying all code changes to a testing environment and/or a production environment after the build stage.

When the smart glasses capture the application source code from the UI, the application source code displayed on the display of the smart glasses may be a stand-alone piece of code and may no longer be linked to the internal development platform and/or the source code repository within the internal development platform. The captured code may be displayed in the form of an image or screen shot.

This stand-alone piece of application source code may be viewed by the user and the user may then audit the text for security vulnerabilities and syntax errors.

Vulnerabilities may include syntax errors within the code. Vulnerabilities may also include personal, private and/or secure data included in the code.

The user may view the application source code via a display on the smart glasses device. The display may be configured to display scanned application source code. The display may be physically configured to add data alongside what the wearer sees through the lenses. In some embodiments, the display may display data as an at least partially transparent overlay on top the lenses. As such, the user may view, through the overlay, the physical objects that are normally seen through lenses. Such a display may be known as an augmented reality smart glasses display.

The smart glasses may include a battery. The battery may be configured to power the microprocessor, the scanning device and the display.

The smart glasses may include a nano wireless network interface card ("NIC"). The nano wireless NIC may be a circuit board and/or a chip, installed within the smart glasses, that enables the smart glasses to establish communication with a wireless network. The nano wireless NIC may support input/output ("I/O"), interrupt, direct memory access, interfaces, data transmission, network traffic engineering and/or partitioning.

The nano wireless NIC may provide the smart glasses with a dedicated, full-time connection to a wireless network. The nano wireless NIC may provide the connection by implementing the physical layer circuitry necessary for communicating with a data link layer standard, such as Wi-Fi.

The nano wireless NIC may operate as an intermediary between the smart glasses and a wireless network. For example, the processor may transmit a request to the nano wireless NIC. The nano wireless NIC may convert the request into electrical impulses. The electrical impulses may be transmitted to a web server. The web server may respond to the nano wireless NIC with additional electrical signals. The nano wireless NIC receives the additional electrical signals. The nano wireless NIC translates the additional electrical signals into data that is consumable by the microprocessor.

The smart glasses may also include an active near field communication ("NFC") reader configured to establish a communication with one or more other smart glasses devices within a pre-determined proximity to the smart glasses device. Smart glasses may communicate with one or more additional smart glasses and other smart devices using NFC technology.

The smart glasses may include software components. One or more software modules may execute on the processors. The one or more software applications may be stored in a memory located within the smart glasses. The one or more software modules may, in the alternative, be referred to as applications. The applications may enable the smart glasses to execute various tasks.

The smart glasses device may include a contactless communication application. The contactless communication application may operate on the smart glasses processor. The contactless communication application may initiate communication with another smart glasses. In some embodiments, the contactless communication application may be an active near field communication ("NFC") reader. As such, the contactless communication application may communicate with another smart glasses using NFC technology.

The microprocessor may be configured to execute a source code vulnerability application. The source code vulnerability application may include instructions to parse the scanned application source code. The parsing may be executed using deep learning. Deep learning may also be referred to as machine learning ("ML"). The source code vulnerability application may also include instructions to identify, based on the parsing, one or more vulnerabilities within the scanned application source code.

Deep learning is a subset of machine-learning. Deep learning classifiers are input during a training stage as labeled training data, otherwise referred to as data that has been classified. Deep learning uses the classifiers to learn from the input data and use the learned information to correctly classify unlabeled data during execution. It should be appreciated that substantially no manual feature of engineering or manual feature of extraction is used during the data training process. A deep learning classifier creates, absent human interaction, a non-linear, multi-dimensional classification model based on the labeled-training data.

Deep learning classifiers typically utilize a layered structure of algorithms known as an artificial neural network ("ANN") to create the non-linear, multi-dimensional classification model. An ANN mimics the biological neural network of the human brain. The ANN is comprised of layers of neurons. Each neuron, included in each layer, takes one or more inputs and produces one output. The output is based on the values of the inputs as well as a weight associated with each inputted value. As such, one input can carry more weight than another input.

In some embodiments, the identifying may include identifying one or more vulnerabilities within the scanned application source code using machine-learning ("ML"). The identifying may include searching the application source code for one or more features stored in an ML database. Each feature may be associated with at least one of the vulnerabilities. Each vulnerability, in the ML database, may be defined as one or more features and a proximity of the one or more features to each other.

For example, a feature may be a date or a partial date. A first name and/or last name may be another feature. A string of characters including either alphanumeric characters, alpha characters or numeric characters may also be a feature. Each feature in this example may standalone as a vulnerability.

Additionally, the combination of the features, when found within a pre-defined proximity of one another may also be considered a vulnerability. For the purposes of this disclosure, when one of the mentioned features follow immediately after the other within the application source code, this may be identified as a vulnerability. For example, when the date follows immediately after or before a name, the date may be a date of birth associated with the identified name. Furthermore, when the string of characters follows immediately after or before the name, the string of characters may be a personal identification number of the identified name as well.

The smart glasses may also be enabled to communicate with an independent cloud repository stored on a local network. The independent cloud repository may include a database that may store a library of a list of potential vulnerabilities and historically known vulnerabilities. The ML may be enabled using the vulnerability library. The library may be pre-loaded with legacy examples. This library may be trained prior to being deployed with exemplary vulnerabilities that may be detected and identified within application source code. The library may also be enabled to store additional vulnerabilities identified over time by users of the smart glasses to enable ML to be more effective.

The library may further store numerous features that standalone as a vulnerability. When in combination, one or more features may be considered a vulnerability. The source-code vulnerability application may be enabled to, by forming different combinations of features using ML, identify vulnerabilities.

The microprocessor may also be configured to execute an editing controller application. The editing controller application may include instructions to, following the identifying of the one or more vulnerabilities, mark each identified vulnerability on the display.

Furthermore, the source code vulnerability application may include instructions to generate a vulnerability report file including the scanned application source code, each identified vulnerability and a linked vulnerability classification code.

The microprocessor may also include a wireless controller application. The wireless controller application may include instructions to interface between the NIC and an external Wi-Fi device, the external Wi-Fi device included in the wireless network. The wireless controller application may also include instructions to transmit, over the wireless network, the vulnerability report file to a source code repository within the internal development platform for assessment.

The editing controller application may be configured to display to a user of the smart glasses device, on the display, a selection of edit-options. The selection may include highlighting, inserting a comment, cross-outs, underline and any other relevant editing tools. The sensors may identify the input of a selected edit-options and the processor may be configured receive the input. The input received may be specific to a selected vulnerability with the scanned application source code. The editing controller application may be further configured to display to the user the selected vulnerability based on the received input of the selected edit-option.

In some embodiments when the smart glasses device is within a pre-determined proximity to the one or more additional smart glasses devices, the smart glasses device is configured to pair the smart glasses devices. The pairing may include transferring the scanned application source code to the one or more additional smart glasses devices using a local network. Once the one or more additional smart glasses receive the application source code, each wearer may initiate input to the source code. The input may be received on the smart glasses via the sensors. The paired smart glasses may all be able to view the input received on each smart glasses. All input received may be shared and may further be combined and generated as one vulnerability report file. The smart glasses may then transmit the one vulnerability report file to the source code repository.

It should be appreciated that the input received may be via an air-based hand gesture and one or more sensors on the smart glasses device may be configured to identify the input received.

For example, the user input may be received from the user via touch gestures to one or more dynamic and/or static buttons on the smart glasses. The user input may also be received at, and/or sensed by, a nano touch screen included in the smart glasses. The nano touch screen may be a nano light emitting diode ("LED") touch screen. The nano touch screen may be a nano organic light emitting diode ("OLED") touch screen. The nano OLED touch screen may be constructed using OLED technology.

OLED technology may enhance functionality of a smart glasses display. OLEDs are typically solid-state semiconductors constructed from a thin film of organic material. OLEDs emit light when electricity is applied across the thin film of organic material. Because OLEDs are constructed using organic materials, OLEDs may be safely disposed without excessive harm to the environment.

Furthermore, OLEDs may be used to construct a display that consumes less power compared to other display technologies. For example, in a Liquid Crystal Display, power must be supplied to the entire backlight, even to illuminate one pixel in the display. In contrast, an OLED display does not necessarily include a backlight. Furthermore, in an OLED display, preferably, only the illuminated pixel draws power.

The power efficiency of OLED technology presents a possibility for designing nodes that consume less power for their basic functionality and allow any residual power to provide enhanced security and functionality. Illustrative devices that may be constructed using OLED technology are disclosed in commonly assigned U.S. Pat. No. 9,665,818, which is hereby incorporated by reference herein in its entirety.

In some embodiments, the nano touch screen may be constructed, using liquid metal printing, from atomically-thin indium-tin oxide ("ITO"). During construction, an indium-tin alloy is heated to 200 degrees Celsius. At 200 degrees Celsius, the indium-tin alloy becomes a liquid. The liquid is then rolled over a surface to print nano-thin sheets of ITO. These nano sheets are two-dimensional and have the same chemical make-up as standard ITO. However, these nano sheets have a different crystal structure than standard ITO. The new crystal structure gives the nano sheets new mechanical and optical properties.

One new property may include the full flexibility of the ITO sheets. These ITO sheets also absorb approximately 0.7% of light, which is lower than standard conductive glass that absorbs 5-10% of light. These ITO sheets may also be transparent. As such, these nano ITO sheets provide fully flexible, conductive and transparent material. Therefore, such atomically-thin ITO sheets may be used to produce nano touch screens for inclusion in smart glasses. The ITO may be wrapped around a portion of the lenses and/or frames of the smart glasses.

The nano LED touch screen may receive touch-based user input, also referred to herein as touch gestures. It should be appreciated that the touch gestures may be accepted at one or more portions of the frames and/or lenses of the smart glasses. As such, the nano LED touch screen may cover a portion of the frames and/or lenses of the smart glasses. Touch gestures may include swiping, tapping, squeezing and any other suitable touch gestures. Touch gestures may also include a pattern of any of the above-mentioned gestures.

The user input may also be received from air-based hand and/or body gestures. Air-based hand and/or body gestures may be performed by the user's hand and/or body without specifically touching the smart glasses.

Various sensors may be included in the smart glasses. These sensors may include the nano LED touch screen, the camera(s), an accelerometer, a gyroscope and any other suitable sensors. These sensors may sense the touch gestures, hand gestures and/or air gestures.

Upon sensing the touch gestures, hand gestures and/or air gestures, the sensor(s) and/or associated processors may translate the touch gestures, hand gestures and/or air gestures into user input. The user input may be based on a user input structure. The user input structure may be a digital alphanumerical pad. In some embodiments, the user input structure may be received from an external processor.

In some embodiments, the smart glasses device may authenticate the user before using the smart glasses to capture the code. An authorization application, included in the smart glasses device, may authenticate the user of the smart glasses. The authentication may be performed via an authorization application included in the smart glasses device. The authorization application may authenticate the user based on a group of detected user behavioral characteristics. The group of detected user behavioral characteristics may include gait, speed, voice detection, head movements and body movements. The authorization application may authenticate the user using any suitable authentication method.

The authorization application may include intelligent iris recognition mechanisms that may authenticate the user based on the detected iris.

In some embodiments, prior to scanning application source code, the scanning device may be in an inactive state. Prior to activating the scanning device, the smart glasses may require authorization. The authorizing may include positioning the smart glasses within near-field communication ("NFC") proximity to the UI. The authorizing may further include receiving input of a password on a virtual keypad on the smart glasses. The smart glasses may receive the password and confirm the password. Following confirmation of the password, a secure token stored on the smart glasses may be activated and the two devices may be paired. Once paired, a communication between the smart glasses and the UI may be normalized and may enable, via one or more applications executed by the processor, capture application source code that may have a higher-level of readability then captured code prior to pairing the devices. Additionally, the captured application source code may be error-free. This may be enabled by the scanning device being enabled to retrieve more than just an image and/or screen shot of the application source code. The scanning device may be able to capture the selected portion of code and the associated web server may be enabled to transmit an error-free copy of the selected portion. This may eliminate the need to apply optimal content recognition ("OCR") on the image and additional algorithms to perfect the clarity of the scanned text.

In some embodiments, the smart glasses may be enabled to be directly linked to the internal development platform. The smart glasses may be operable to analyze, in real-time, application source code during the development. Additionally, two or more smart glasses may be paired. When paired, users of the smart glasses may be able to share the view on the display of the smart glasses within each of their own smart glasses. Application source code may be reviewed and corrected and all editions may be updated on all paired smart glasses.

When application source code is broken and/or an error occurs during testing, multiple users may pair smart glasses and resolve the issues together. In some embodiments, a smart glasses may be viewing the application source code to correct an error. The primary reviewer may, via the smart glasses, capture the application source code that may be broken. The captured code may then be shared, via the internal network platform, to one or more additional smart glasses. Multiple users may then be enabled to review the issues and resolve the errors on the smart glasses. The editions may be made on the glass and then transmitted back into the original application via any one of the smart glasses.

Within the internal development platform, application source code during development, production and deployment are being monitored. Following deployment of code, if an error occurs, an entire architecture of the development of the deployed code may be opened on the display of the smart glasses and may enable multiple teams to view the architecture collaboratively. This may enable resolving the errors and bugs more accurately and quickly.

Following receipt of an indication of an error in code, a primary reviewer may view and capture via the smart glasses, the portion of code that may include the error. The smart glasses may transmit a communication to one or more secondary reviewer smart glasses. When the one or more secondary reviewer smart glasses opt-in to accept the communication, the portion of code including the error may be transmitted and displayed on the virtual display of the secondary reviewer smart glasses enabling collaboratively viewing, reviewing and editing of the portion of code.

One of ordinary skill in the art will appreciate that the steps shown and described herein may be performed in other than the recited order and that one or more steps illustrated may be optional. Apparatus and methods may involve the use of any suitable combination of elements, components, method steps, computer-executable instructions, or computer-readable data structures disclosed herein.

Illustrative embodiments of apparatus and methods in accordance with the principles of the invention will now be described with reference to the accompanying drawings, which form a part hereof. It is to be understood that other embodiments may be utilized and that structural, functional and procedural modifications may be made without departing from the scope and spirit of the present invention.

As will be appreciated by one of skill in the art, the invention described herein may be embodied in whole or in part as a method, a data processing system, or a computer program product. Accordingly, the invention may take the form of an entirely hardware embodiment, an entirely software embodiment or an embodiment combining software, hardware and any other suitable approach or apparatus.

Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

FIG. 1 shows an illustrative flow diagram 100 of smart glasses 122 and the user interface screen 102 where the application source code may be captured from.

Smart glasses 122 may include one or more microprocessors, one or more displays, one or more cameras, one or more audio input devices, one or more audio output devices and/or one or more wired and/or wireless communication modules (e.g., Bluetooth®, Beacon®).

The UI 102 may be a computer screen. The UI 102 may be hooked to the internal development platform 120. The UI may display application source code. The application source code may be a portion of code from an application being developed.

An auditor may use smart glasses 122 to capture the application source code displayed on the UI. The auditor may be reviewer from the entity associated with the application. The auditor may be a third-party independent reviewer.

It should be appreciated that smart glasses 122 may be paired with one or more smart glasses 124 via a local network. This may enable a team of auditors to view the same captured code on each of their own smart glasses and share the mark-ups as well as identified vulnerabilities. The smart glasses may not need to be within close proximity to enable sharing the captured code.

The scanning device 104 may be a part of the smart glasses 122. Scanning device 104 may be enabled to capture the application source code displayed on the UI. The application source code may have no internal connection to the internal source code repository 118 within the internal development platform 120.

The captured application source code may be prepared for annotating and deep learning to identify the vulnerabilities that may exist within the code. The smart glasses may be configured to automatically identify the vulnerabilities. The smart glasses may include one or more applications for identifying the vulnerabilities. The application source code may be maintained as is captured from the UI. For example, the application code that is displayed on the UI on line 1 may be maintained on line 1 on the display of the smart glasses. By maintaining line numbers for the code, this may enable a level of information and intelligence to the code. This may enable matching and further synchronizing the captured code to the original source in the source code repository once the code is analyzed and returned to the source code repository 118 at the internal development platform 120.

Following the capturing of the application source code at 104, the application source code may be parsed into a deep learning engine as shown at 106 to identify vulnerabilities. The information may be projected on the smart glasses. The deep learning engine may be an application that may parse the code and run a vulnerability detection engine 108 to identify one or more vulnerabilities that may exist in the application source code. The vulnerability detection engine 108 may be an application executed by the processor that may analyze the code and based off of a library of previously stored vulnerabilities on the database at 110, identify the vulnerabilities within the captured code. This may be an automatic process. The vulnerability projection and mapping engine 112 may be an additional application run on the smart glasses to identify vulnerabilities.

The vulnerability detection engine 108 may also include a tool that may enable marking the code that may be vulnerable i.e.—highlight and lock. The smart glasses may include a hololens that may use holographic processing. The smart glasses within a virtual environment may enable the selecting and highlighting of the code.

Additionally, the user of the smart glasses may also be enabled to analyze the code to identify vulnerabilities. The smart glasses may be enabled to receive input of a selected text and highlighting text by hand movements that may be detected by one or more sensors on the smart glasses.

The vulnerability projection and mapping engine 112 may further prepare the analyzed application source code to be transferred to the internal development platform for further productivity. Engine 112 may combine the application source code and the identified vulnerabilities as one file to be extracted at the internal development platform 120. The application source code may be prepared in a file format that may enable it to be ingested within the internal development platform 120.

Engine 112 may also generate a map that may match the vulnerabilities identified to the lines of code. This mapping may also be included in the one file transmitted to the internal development platform 120.

When the file is received at the internal development platform 120, the source code mapping and extraction deep learning engine 114 may extract the file and analyze the identified vulnerabilities. The engine 114 may determine what portions of the code may be transmitted to the source code quarantine for quarantining until corrected and enabled to be deployed at 116. The source code mapping engine 114 may map the captured application source code to the original source of the captured code. Once the original source is identified, real-time release of the original code may be paused until the vulnerabilities are corrected.

When the application source code is scanned from the UI onto the smart glasses, the location of the application source code within the original application may be identified and stored. The location may include a start point and an end point including line numbers based off of the entire original application source code. Following the identifying of the vulnerabilities within the scanned code, the report may be ingested back into the internal development platform. The internal platform may locate the exact location where the portion of application source code may be within the original application and extract the original portion to enable resolving the vulnerability issues prior to production.

Following extracting the original portion, the vulnerabilities may be resolved and corrected and the internal network platform may generate a revised version. The revised version may be inserted at the original location and replace the original portion.

Figure 2:
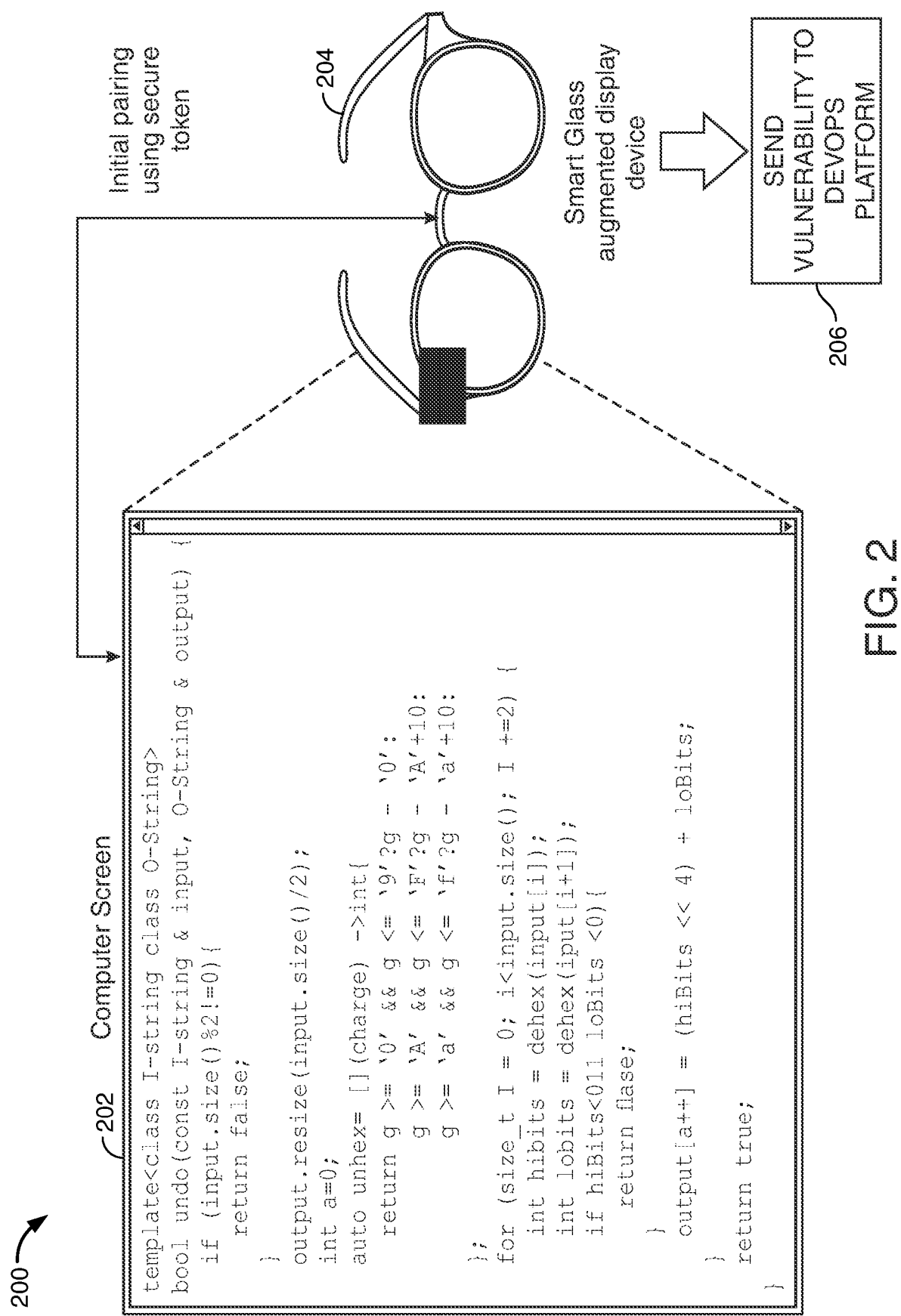
FIG. 2 shows an illustrative flow diagram in accordance with principles of the disclosure.

FIG. 2 shows an exemplary diagram 200 of smart glasses 204 and a UI wherein the application source code is captured by the smart glasses 204.

The application source code displayed on the computer screen 202 may be a portion of code extracted from an application in progress. The code displayed may be linked to the internal development platform. The smart glasses may only be enabled to capture the code and may have no access to the internal development platform which is linked to the code displayed.

Smart glasses 204 may be operable to capture the application source code displayed on UI 202. The smart glasses 204 may require authentication to enable the scanning device within the smart glasses to be activated. The authentication may include receiving user identification information and/or a password via input on the smart glasses. The identification information and/or password may be received at the internal network platform and may be authenticated. Following authentication, the smart glasses may be triggered to capture the application source code displayed on the UI.

Once authenticated, the smart glasses may capture the code displayed on the computer screen 202, execute one or more applications to identify the vulnerabilities and as shown at 206, transmit a vulnerability report to the internal development platform.

Figure 3:
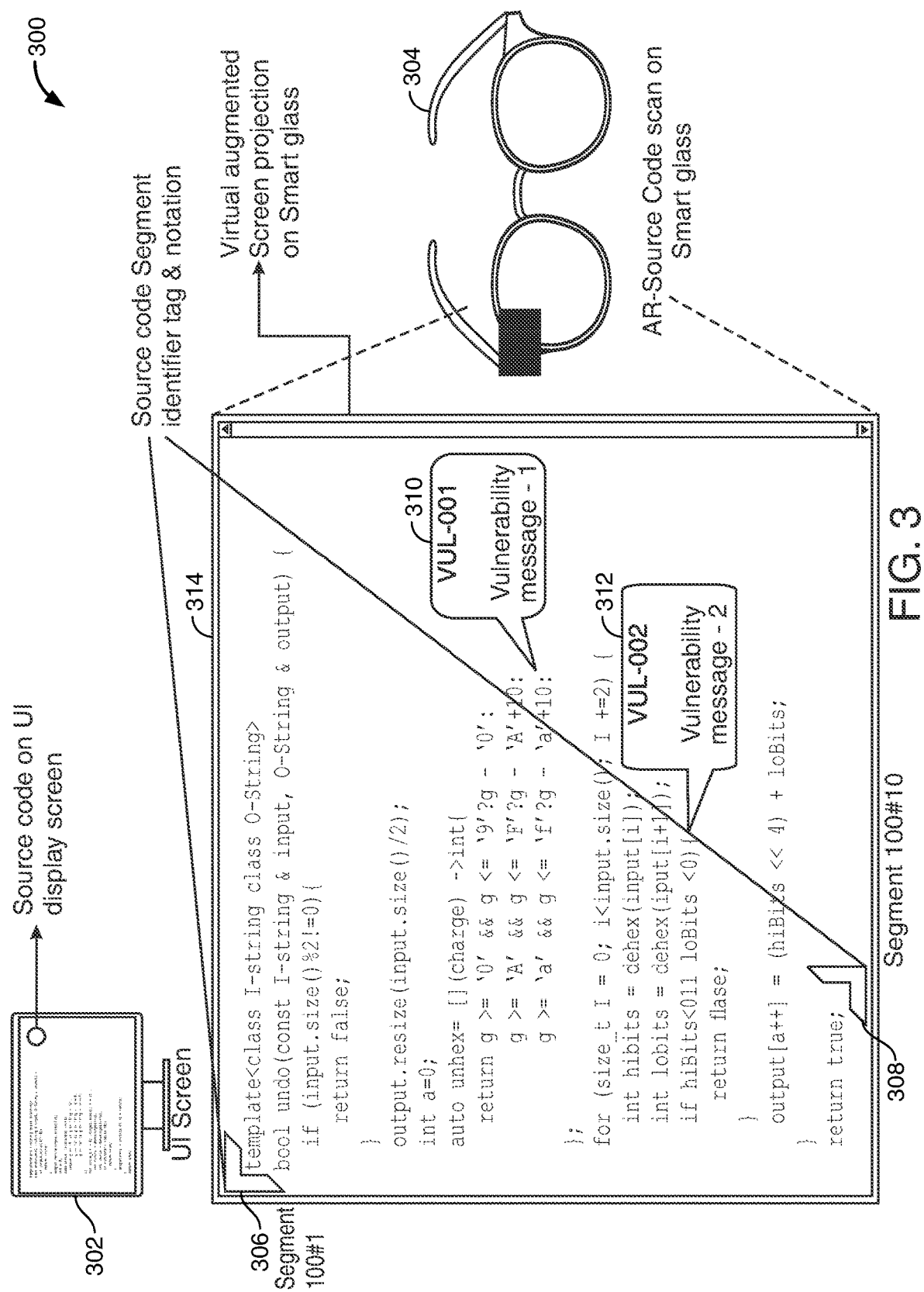
FIG. 3 shows an illustrative diagram in accordance with principles of the disclosure.

FIG. 3 may display a diagram of a source code vulnerability identification system 300. System 300 may include a UI screen 302, smart glasses 304 and a display 314 that is viewed via the smart glasses 304.

The application source code on the display 314 may be an augmented reality source code scan. The application source code may be a screen-shot displayed as an image on the display 314. Display 314 may be displayed on a virtual augmented screen projected on the smart glasses 304.

Smart glasses 304 may be enabled to analyze the code on display 314 for vulnerabilities. Smart glasses 304 may execute an application that may mark-up the code and analyze the code. The mark-up may include marking the beginning and end of the displayed code by a segment marker as shown at 306 and 308. The segment marker may be labeled based on the portion of code that may be originally captured from the UI screen 302. The labeled segments may enable mapping the displayed code to the original source within the internal development platform following the analyzing of the code.

Additionally, each identified vulnerability may be highlighted and labeled as shown at 310 and 312. It should be appreciated that 310 and 312 may be exemplary identified vulnerabilities.

Figure 4:
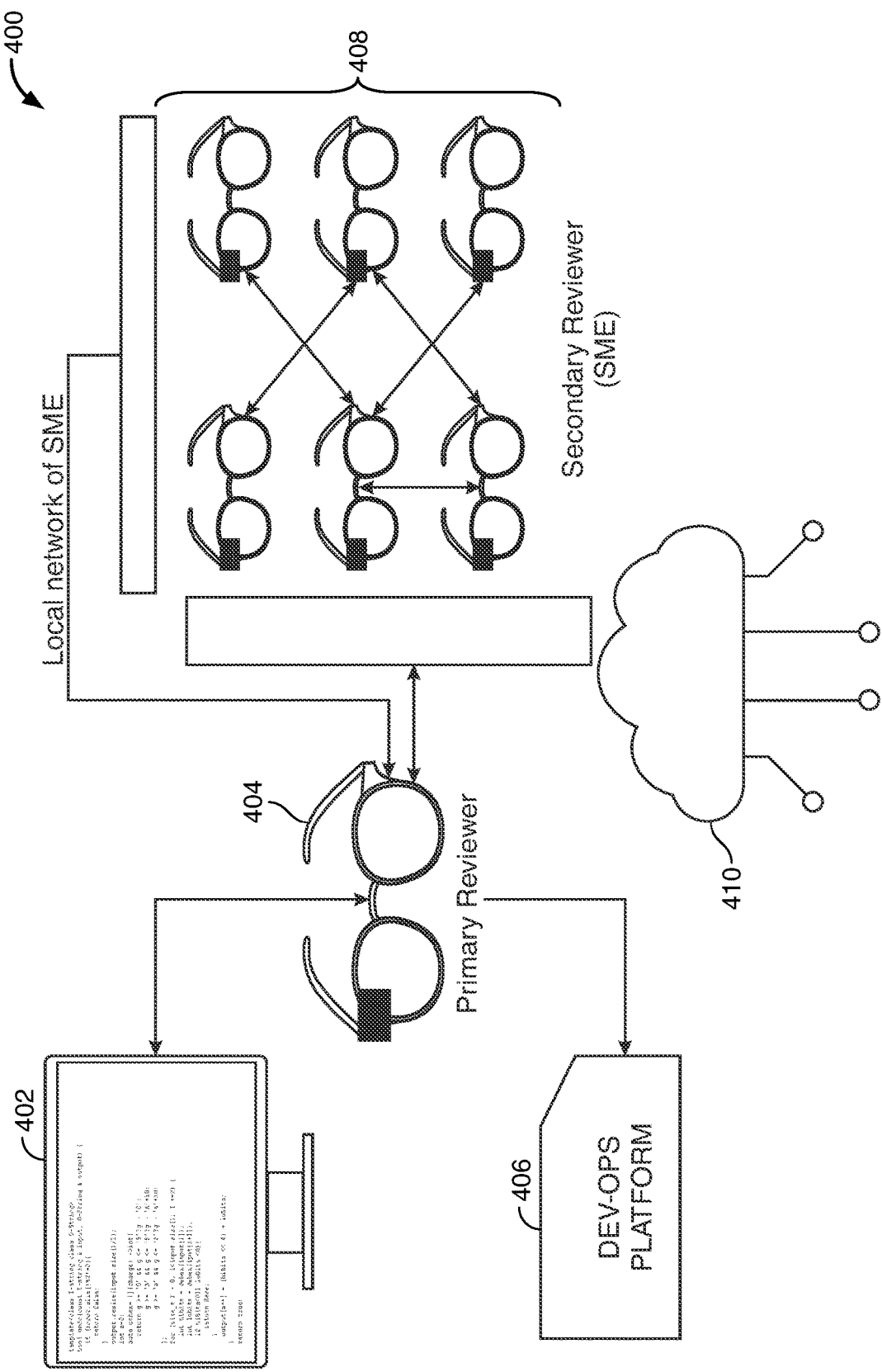
FIG. 4 shows an illustrative diagram in accordance with principles of the disclosure.

FIG. 4 shows an exemplary diagram of a source code vulnerability identification system 400 including two or more smart glasses. System 400 may include smart glasses 404 which may be a primary reviewer of the application source code. System 400 may include one or more smart glasses 408 that may be secondary reviewers of the application source code.

Smart glasses 404 may capture code displayed on UI 402 and may view it within a display on smart glasses 404. Smart glasses 404 may share the captured code with one or more smart glasses 408. Smart glasses 404 and each of smart glasses 408 may be paired via the local network 410.

Smart glasses 404, following analyzing and editing of the captured code, may transmit the identified vulnerabilities and the captured code to the DevOps platform 406.

Figure 5:
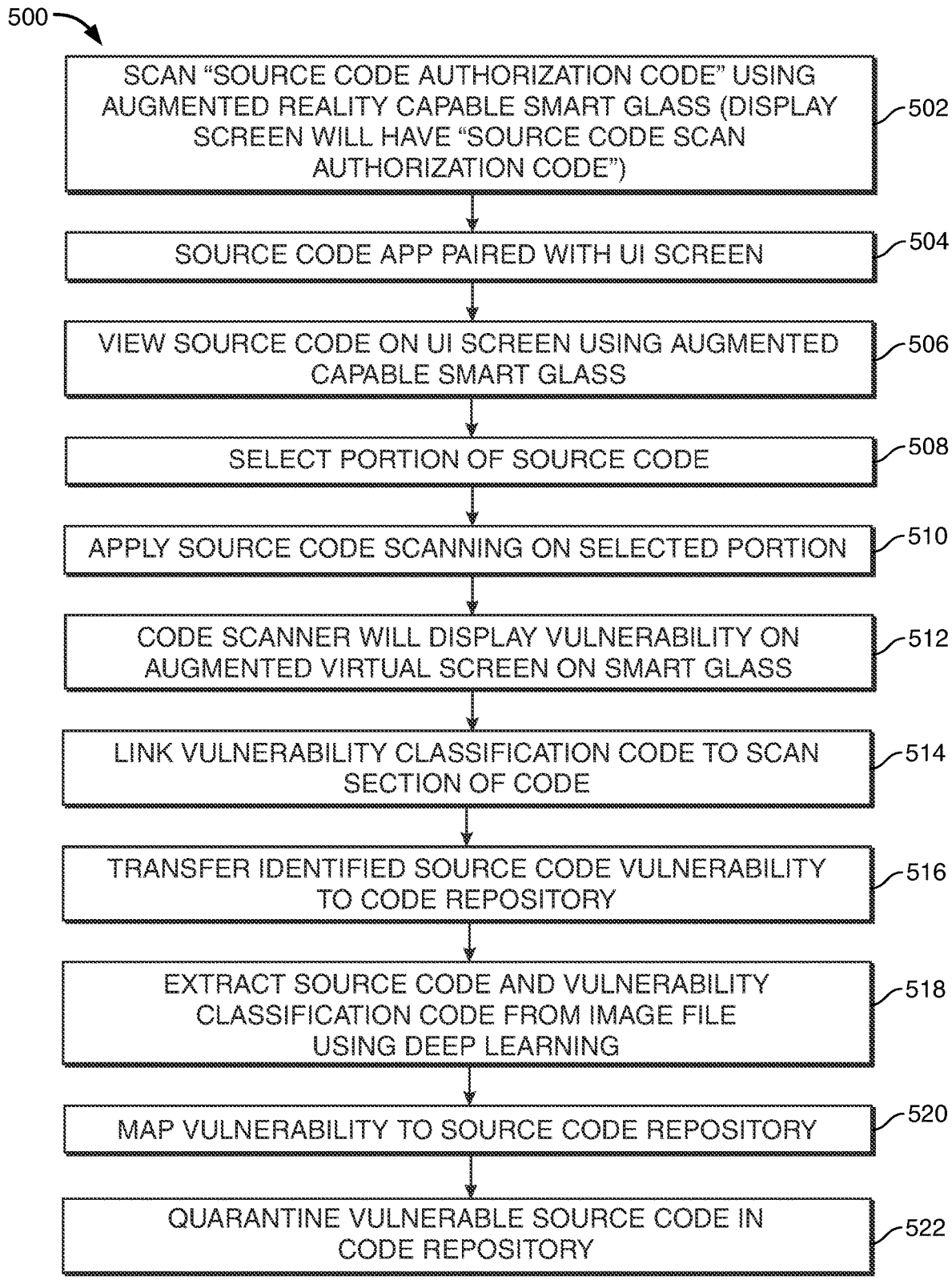
FIG. 5 shows an illustrative flow chart in accordance with principles of the disclosure.

FIG. 5 shows a flowchart 500 of the steps for a system to identify vulnerabilities within application source code. At step 502, augmented reality capable smart glasses may be configured to scan a source code authorization code from the display screen. This step may be performed in order to authorize the smart glasses to scan application source code from the display screen.

Following authorization of the smart glasses, the source code application within the smart glasses may be enabled to be paired with the UI screen as shown at step 504. Once paired, the smart glasses may be enabled to be activated to capture data from the UI screen.

At step 506, the smart glasses may view the source code displayed on the UI screen.

At step 508, the smart glasses may select a portion of the source code that is displayed on the UI screen. At step 510, the smart glasses may be enabled to apply the scanning on the selected portion of the source code.

At step 512, the code scanner may display the selected portion of source code on the augmented virtual screen of the smart glasses. Furthermore, a vulnerability identification application may be executed and may identify the vulnerabilities within the selected portion of source code. The vulnerabilities may be selected. The vulnerabilities may be displayed to the user in one or more modes. The vulnerabilities may be highlighted, circled, underlined and/or listed separately on the augmented virtual screen.

At step 514, the system may link a vulnerability classification code to each identified vulnerability with the scanned portion of source code. At step 516, the identified source code vulnerabilities and the linked classification codes may be transferred to the source code repository within the internal development platform. They may be combined as one image file and then transmitted to the internal development platform.

At step 518, the source code and vulnerability classification codes may be extracted from the image file using deep learning.

At step 520, the system may map the identified vulnerabilities to the original source code within the source code repository. Following the identifying of the original source code that includes the identified vulnerabilities, the system may quarantine the vulnerable source code within the code repository, as shown at step 522.

Thus, methods and apparatus for leveraging smart glasses for capturing application source code associated with an application and further identifying vulnerabilities within the application source code is provided. Persons skilled in the art will appreciate that the present invention can be practiced by other than the described embodiments, which are presented for purposes of illustration rather than of limitation, and that the present invention is limited only by the claims that follow.

What is claimed is:

1. A method for leveraging smart glasses for capturing application source code associated with an application and further identifying vulnerabilities within the application source code, the capturing being independent from accessing an internal development platform associated with the application, the method comprising:

scanning, using a scanning device embedded on the smart glasses, application source code displayed on a user interface ("UI");

projecting the scanned application source code on an augmented virtual screen on the smart glasses;

identifying one or more vulnerabilities within the scanned application source code using machine-learning ("ML"), the identifying including searching the application source code for one or more features stored in a ML database, each feature being associated with at least one of the vulnerabilities;

linking a vulnerability classification code for each identified vulnerability, the vulnerability classification code retrieved from a cloud repository, the cloud repository residing on a cloud independent from the internal development platform;

generating a vulnerability report file including the scanned application source code, each identified vulnerability and its linked vulnerability classification code;

transferring the vulnerability report file to a source code repository within the internal development platform;

extracting from the vulnerability report file, the scanned application source code, each identified vulnerability and the linked vulnerability classification code associated with each identified vulnerability;

matching the scanned application source code to an original application source code within the source code repository; and separating, pending completion of revisions to the code based off of the vulnerability report file, the original application source code from the application within the source code repository.

2. The method of claim 1 further comprising receiving identification of each vulnerability via a user of the smart glasses.

3. The method of claim 2 wherein the receiving further comprises, receiving input via selecting by finger-touch on the augmented virtual screen, each identified vulnerability and highlighting the selected code to mark each vulnerability.

4. The method of claim 1 wherein the identifying comprises using a source code vulnerability library stored in an open-source cloud repository.

5. The method of claim 1 wherein prior to scanning, the method comprises:
receiving input of a password on a virtual keypad;
confirming the password;
authorizing the smart glasses; and
pairing the smart glasses to the UI.

6. The method of claim 5 wherein following the pairing, the method comprises capturing via the scanning device, an error-free portion of application source code.

7. The method of claim 1 wherein the smart glasses are operating as a primary reviewer of the scanned application source code and the method further comprises sharing the scanned application source code with one or more additional smart glasses, the one or more additional smart glasses operating as a secondary reviewer of the scanned application source code.

8. The method of claim 7 wherein the sharing comprises:
positioning the smart glasses with a pre-determined proximity to the one or more additional smart glasses; and
transmitting, using NFC, the scanned application source code to the one or more additional smart glasses.

9. A smart glasses device comprising:
a microprocessor configured to execute one or more applications on the smart glasses device for identifying vulnerabilities within application source code;
a pair of lenses;
a frame clasping the pair of lenses;
a scanning device configured to scan application source code displayed on a user interface ("UI");
a display configured to display scanned application source code;
a battery configured to power the microprocessor, the scanning device and the display;
a nano wireless network interface card ("NIC"), said NIC for establishing communication with a wireless network;
an active near field communication ("NFC") reader configured to establish a communication with one or more other smart glasses devices within a pre-determined proximity to the smart glasses device; and
the microprocessor configured to execute:
a source code vulnerability application configured to:
parse the scanned application source code; and
identify using machine learning ("ML"), based on the parsed scanned application source code, one or more vulnerabilities within the scanned application source code, the identifying including searching the application source code for one or more features stored in a ML database, each feature being associated with at least one of the vulnerabilities;
an editing controller application to, following the identifying of the one or more vulnerabilities, mark each identified vulnerability on the display:
the source code vulnerability application to generate a vulnerability report file including the scanned application source code, each identified vulnerability and a linked vulnerability classification code; and
a wireless controller application to:
interface between the NIC and an external Wi-Fi device, the external Wi-Fi device included in the wireless network; and
transmit, over the wireless network, the vulnerability report file to a source code repository within the internal development platform for assessment.

10. The smart glasses device of claim 9 wherein the display is an augmented reality display.

11. The smart glasses device of claim 9 wherein the display is embedded on the lens of the smart glasses device.

12. The smart glasses device of claim 9 wherein when the smart glasses device is within the pre-determined proximity to a one or more additional smart glasses devices, the smart glasses device is configured to pair the smart glasses device with the additional smart glasses devices.

13. The smart glasses device of claim 12 wherein the pairing comprises:
transferring the scanned application source code to the one or more other smart glasses devices using a local network;
receiving input from one or more users of the smart glasses devices;
sharing the received input on each of the smart glasses devices displays;
combining all received input into one vulnerability report file; and
transmitting the one vulnerability report file to the source code repository.

14. The smart glasses device of claim 9 wherein the editing controller application is configured to:
display to a user of the smart glasses device, on the display, a selection of edit-options;
receive input of a selected edit-option;
receive input of a selected vulnerability with the scanned application source code; and
display to the user the selected vulnerability based on the received input of the selected edit-option.

15. The smart glasses device of claim 14 wherein the input received is via an air-based hand gesture and one or more sensors on the smart glasses device is configured to identify the input received.

16. The smart glasses device of claim 15 wherein the sensors comprise one or more of an accelerometer, gyroscope and touch pad.

17. The smart glasses device of claim 9 wherein the scanning device comprises one or more cameras.

18. The smart glasses device of claim 9 wherein the internal development platform is a platform that combines both software development and information technology ("IT") operations ("DevOps") within the platform.

19. A method for leveraging smart glasses for capturing application source code associated with an application and further identifying vulnerabilities within the application source code, the capturing independent from accessing an internal development platform associated with the application, the method comprising:
identifying a start point and an end point of a portion of the application source code from within an entire application source code;
scanning, using a scanning device embedded on the smart glasses, the portion of application source code displayed on a user interface ("UI");
projecting the scanned application source code on an augmented virtual screen on the smart glasses;
identifying one or more vulnerabilities within the scanned application source code using machine-learning ("ML"), the identifying including searching the application source code for one or more features stored in a ML database, each feature being associated with at least one of the vulnerabilities;

linking a vulnerability classification code for each identified vulnerability, the vulnerability classification code retrieved from a cloud repository, the cloud repository residing on a cloud independent from the internal development platform;

generating a vulnerability report file including the scanned application source code, each identified vulnerability and its linked vulnerability classification code;

transferring the vulnerability report file to a source code repository within the internal development platform;

extracting from the vulnerability report file, the scanned application source code, each identified vulnerability and the linked vulnerability classification code associated with each identified vulnerability;

mapping the scanned application source code to its original application source code within the source code repository, the mapping comprising, based off the identified start point and end point, locating the start point and end point within the entire application source code; and separating, pending completion of revisions to the code based off of the vulnerability report file, the located original application source code from the application within the source code repository.

20. The method of claim 19 wherein following the completion of the revisions, generating a corrected version of the scanned application source code and replacing the located original application source code with the corrected version.

* * * * *